(12) United States Patent
Wang

(10) Patent No.: US 6,352,051 B1
(45) Date of Patent: Mar. 5, 2002

(54) EGG-LAYING TANK FOR HOME AQUARIUM WITH EGG PROTECTION ARRANGEMENT

(75) Inventor: Chiao-Ming Wang, Taichung Hsien (TW)

(73) Assignee: Meiko Pet Corporation, Taichung Hsien (TW)

( * ) Notice: Subject to any disclaimer, the term of this patent is extended or adjusted under 35 U.S.C. 154(b) by 0 days.

(21) Appl. No.: 09/670,025

(22) Filed: Sep. 26, 2000

(51) Int. Cl.[7] ............................................... A01K 63/00
(52) U.S. Cl. ..................... 119/252; 119/248; 119/261
(58) Field of Search ................................ 119/248, 251, 119/252, 259, 261, 263, 269

(56) References Cited

U.S. PATENT DOCUMENTS

| | | | | |
|---|---|---|---|---|
| 1,552,063 A | * | 9/1925 | Kuehn | 119/252 |
| 3,216,395 A | * | 11/1965 | Girard | 119/252 |
| 3,584,602 A | * | 6/1971 | Stasio | 119/252 |
| 3,651,785 A | * | 3/1972 | Quinn | 119/252 |
| 3,900,004 A | * | 8/1975 | Goldman et al. | 119/252 |
| 5,144,908 A | * | 9/1992 | Tominaga | |
| 5,588,396 A | * | 12/1996 | Yoshida | 119/252 |

* cited by examiner

Primary Examiner—Peter M. Poon
Assistant Examiner—Susan Piascik
(74) Attorney, Agent, or Firm—Rosenberg, Klein & Lee

(57) ABSTRACT

A fish egg-laying tank comprises a housing secured to a fish tank including a recess in the bottom having a plurality of openings on the top, an egg-laying container supported on the housing including an inverted cone-shaped member and a hole at the small end, an air chamber in the rear of housing in communication with the container, and a filter tank fitted in the recess. Water in the housing is flowed when air is pumped thereinto such that the solved feces of fishes are flowed onto the filter tank through the inverted cone-shaped member, the hole and the top openings of the recess and the eggs of fishes are dropped onto the bottom of the housing other than the filter tank through the inverted cone-shaped member and the hole.

2 Claims, 6 Drawing Sheets

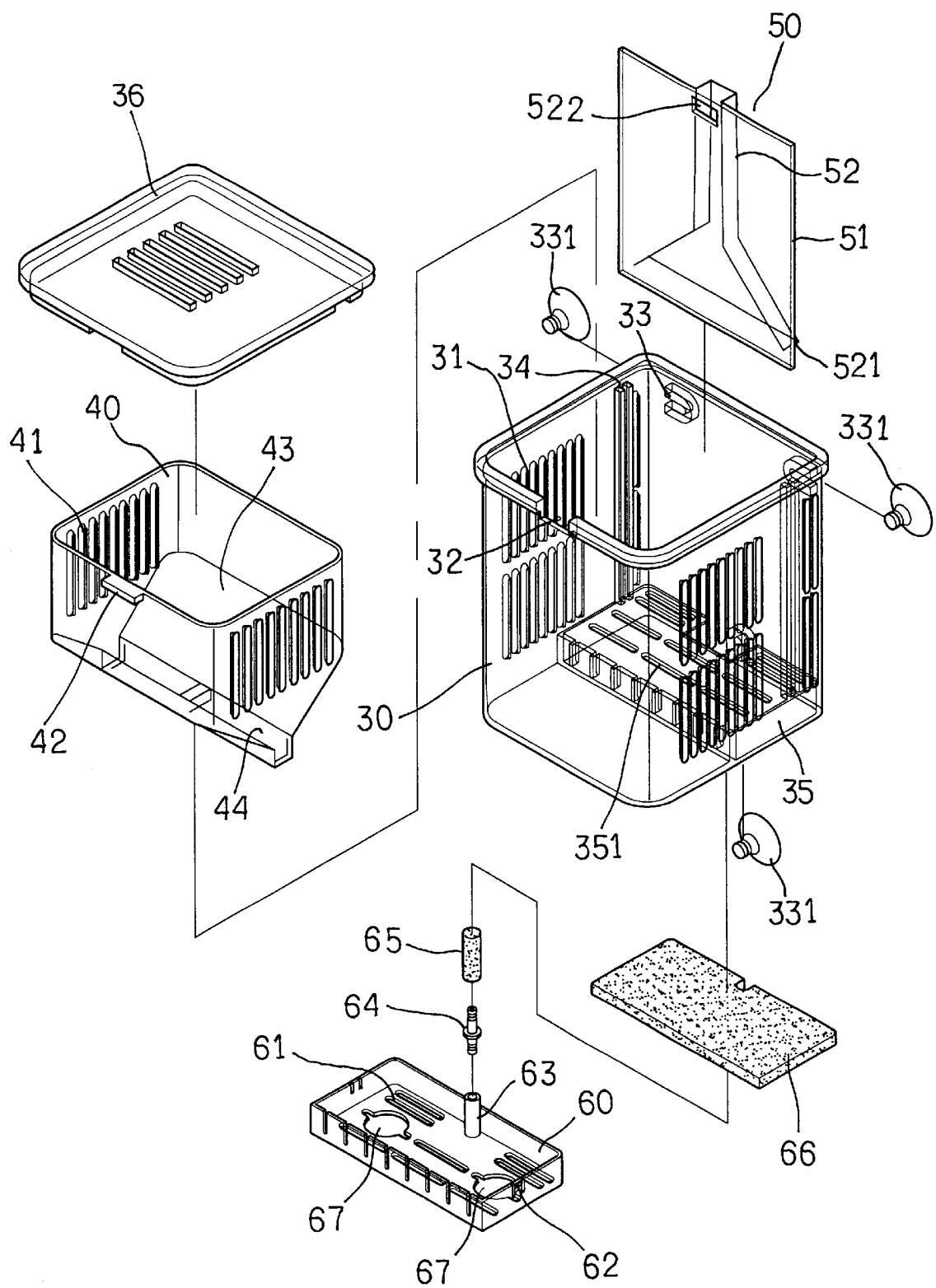
F I G. 3

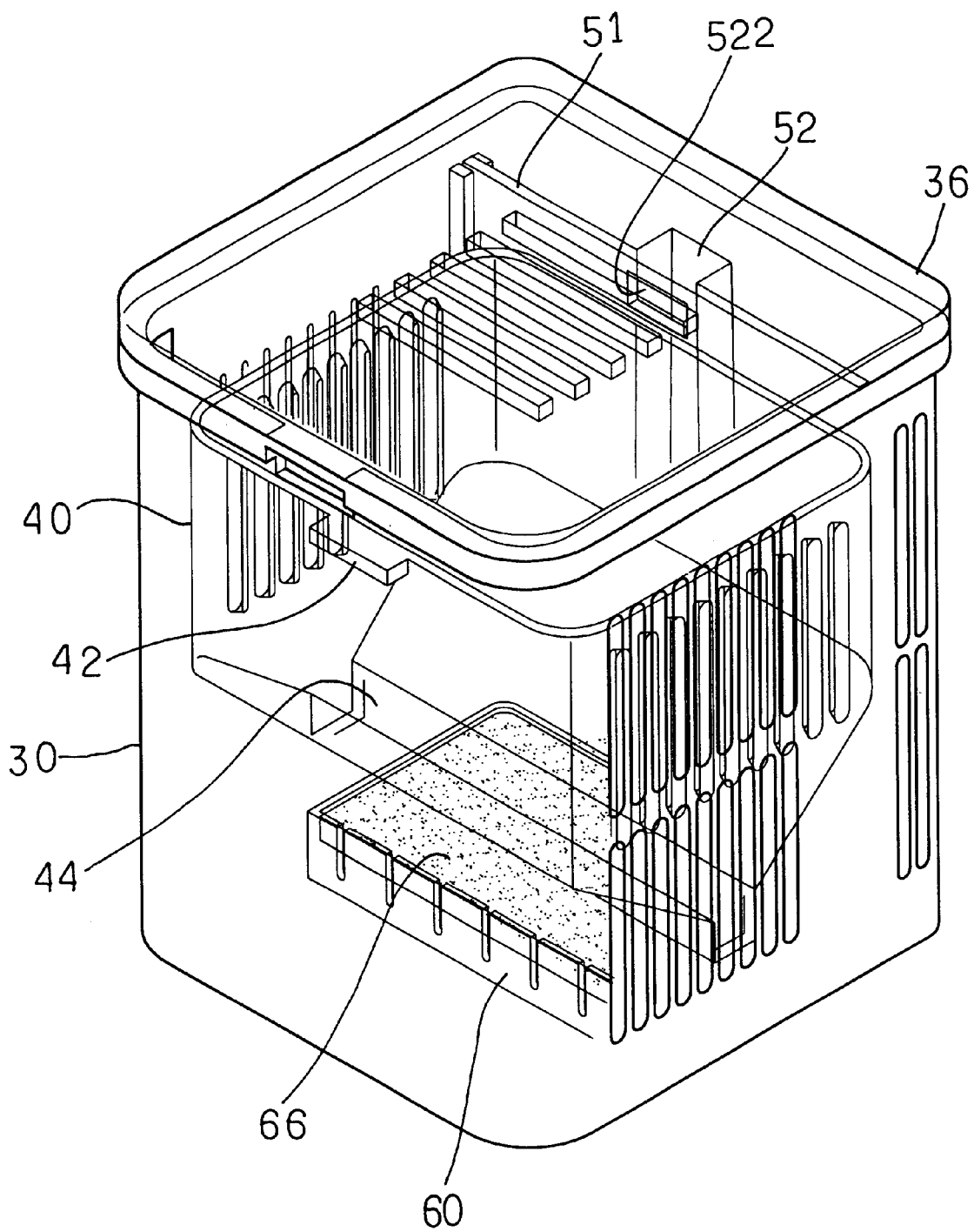
F I G. 4

EGG-LAYING TANK FOR HOME AQUARIUM WITH EGG PROTECTION ARRANGEMENT

FIELD OF THE INVENTION

The present invention relates to fish tanks and more particularly to an egg-laying tank for home aquarium with egg protection device.

BACKGROUND OF THE INVENTION

A conventional fish tank 1 is shown in FIG. 1 comprising a housing 1 filled with water for raising fishes, a cover 11 applied thereon to securely close the housing 1, and a plurality of pipes 13 on the side connected between a pump (not shown) and the wall of housing 1 so as to provide fresh air into the housing 1. However, the previous design suffered from a disadvantage, i.e., fishes and laid eggs are not separated. As such, fishes may tend to eat eggs.

Another conventional egg-laying tank 20 for home aquarium is shown in FIG. 2 comprising a housing 21 filled with water for raising fishes and at least one egg-laying containers 22 hung on the walls of housing 21 wherein each egg-laying container 22 has an inverted cone-shaped member 23 and a hole 24 at the small end. The egg laid by pipe may drop through the hole 24 by its own weight. With this, the purpose of separating laid eggs and fishes for preventing eggs from being eaten by fishes is achieved. But this is still unsatisfactory for the purpose for which the invention is concerned because feces and eggs both drop into the bottom of tank 20 to mix. As such, eggs may be contaminated.

SUMMARY OF THE INVENTION

It is thus an object of the present invention to provide an egg-laying tank for home aquarium with egg protection device so as to obviate the aforementioned problem of eggs and feces being mixed.

The above and other objects, features and advantages of the present invention will become apparent from the following detailed description taken with the accompanying drawings.

BRIEF DESCRIPTION OF THE DRAWINGS

FIG. 3 is an exploded view of a first preferred embodiment of an egg-laying tank for home aquarium with egg protection device according to the invention;

FIG. 4 is a perspective view of the assembled FIG. 3 tank;

DETAILED DESCRIPTION OF THE PREFERRED EMBODIMENTS

Figure 1:
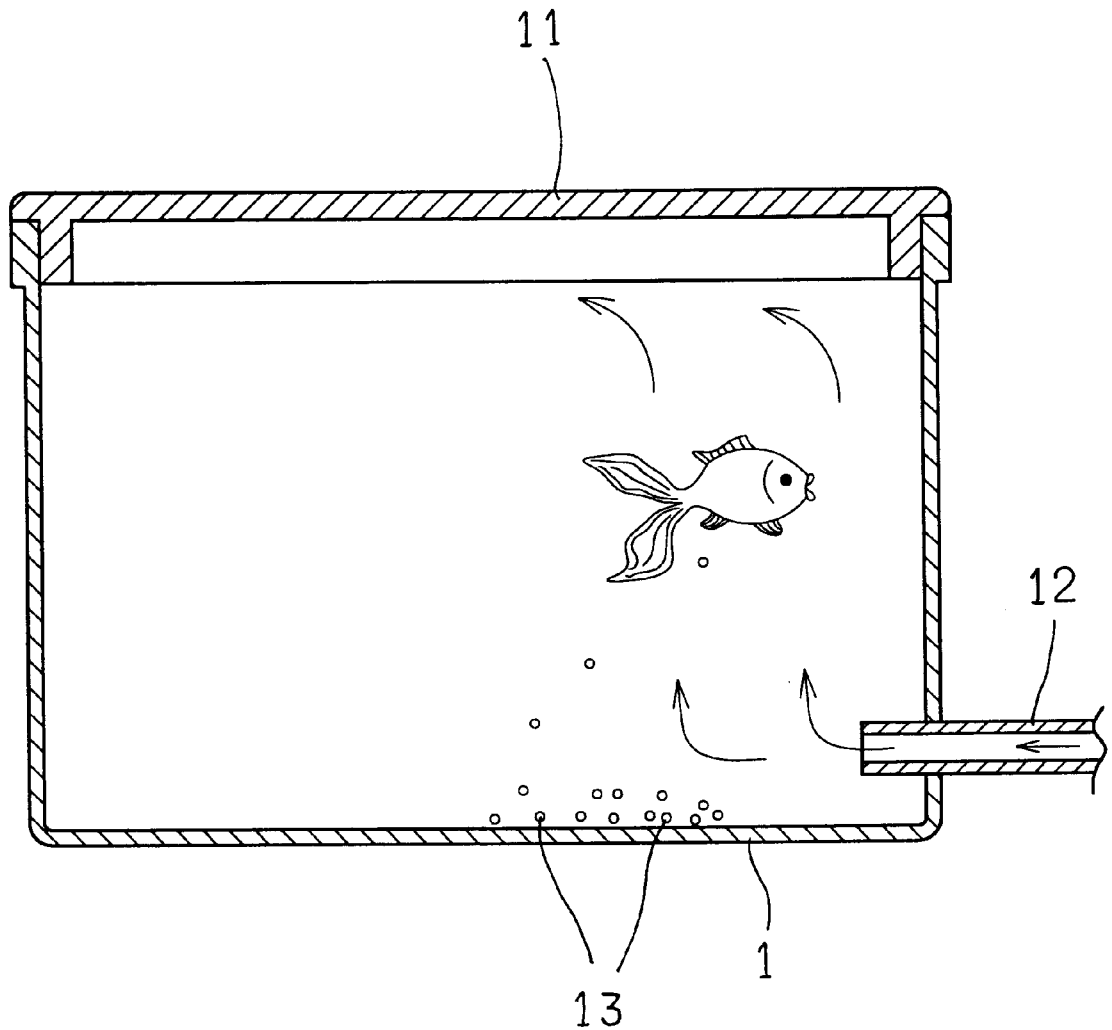
FIG. 1 is a cross-sectional view of a conventional fish tank without egg-laying protection device.
Figure 2:
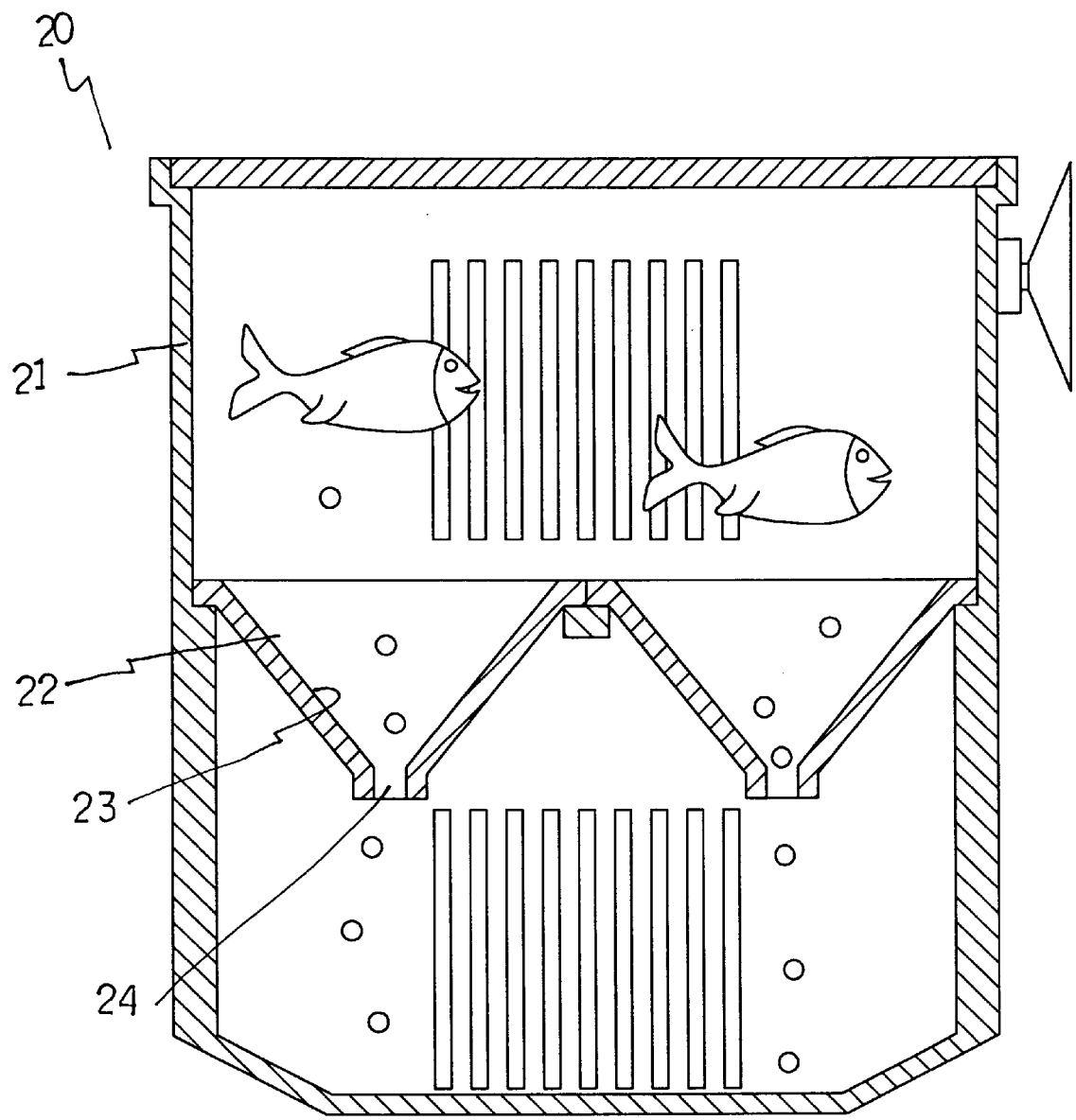
FIG. 2 is a cross-sectional view of another conventional egg-laying tank for home aquarium with egg-laying protection device which is not advantageous.
Figure 5:
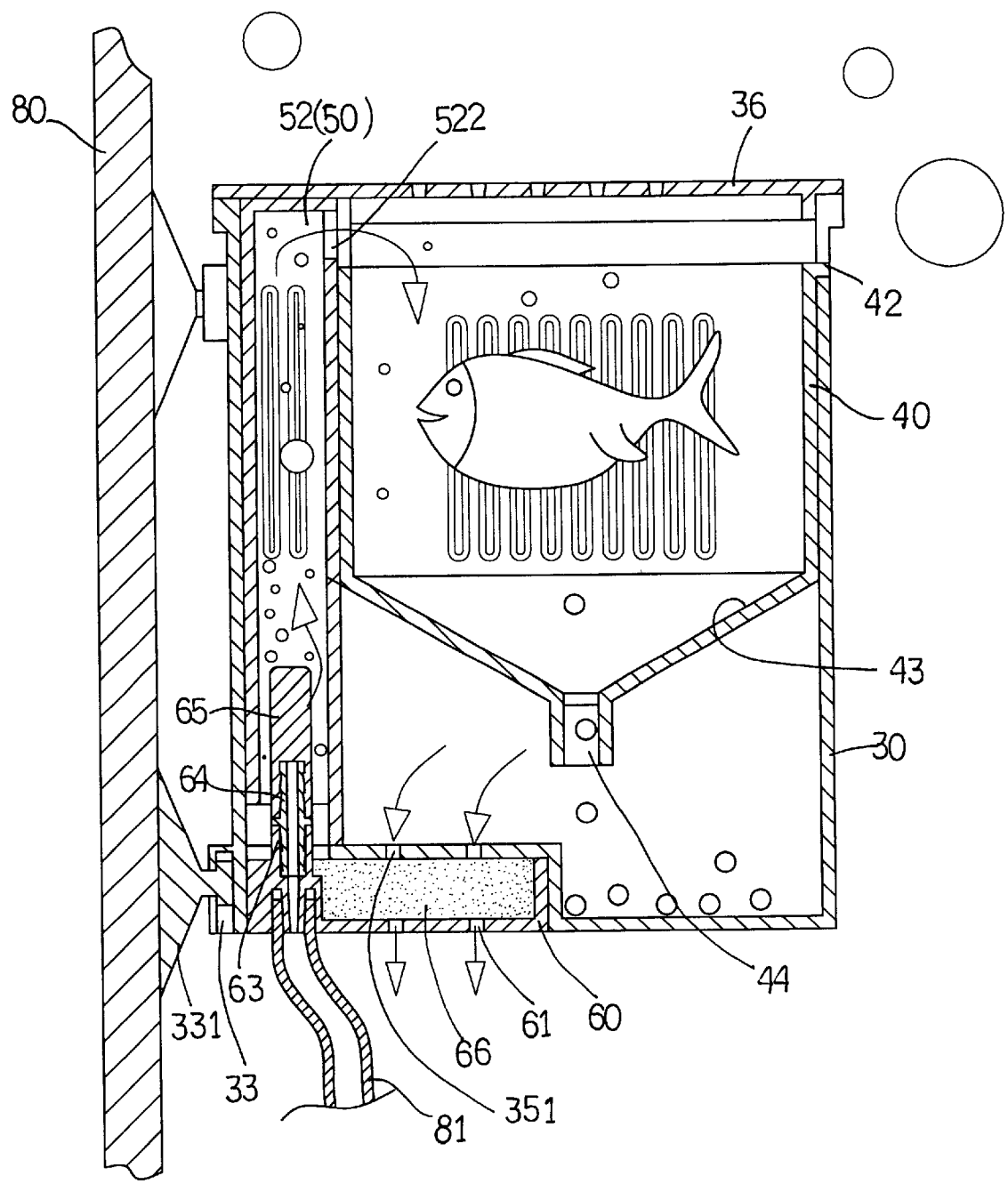
FIG. 5 is a cross-sectional view of the tank shown in FIG. 4 wherein the tank is attached to a fish tank.

Referring to FIGS. 3 to 5, there is shown an egg-laying tank for home aquarium with egg protection device constructed in accordance with the invention. The tank comprises a housing 30 including a plurality of vertical elongate openings 31 spaced from each other on the both sides, a slot 32 on the top of the front, two spaced grooves 33 in the rear each having a suction cup 331 secured to the wall of a fish tank 80, a pair of opposite guided rails 34 on the sides, a recess 35 in the bottom abutted on the side having a plurality of horizontal elongate openings 351 spaced from each other on the top of the recess 35, and a cover 36 applied thereon to securely close the housing 30.

Egg-laying container 40 generally having a rectangular cross-section open to the top comprises a plurality of vertical elongate openings 41 spaced from each other on both sides, a tab 42 on the top of the front side engaged with the slot 32 so as to support housing 30 thereon, an inverted cone-shaped member 43, and a hole 44 at the small end.

Air chamber 50 comprises a plate 51 slidably guided in the rails 34 and a channel 52 in the rear having a funnel-shaped inlet 521 in the bottom and an outlet 522 on the top being in communication with egg-laying container 40.

Filter tank 60 open to the top comprises a plurality of elongate openings 61 spaced from each other on both sides and bottom side, a pair of opposite ridges 62 on the sides for frictionally connected to the sides of recess 35, a hollow cylindrical member 63 in the rear, a tube 64 enclosed by the cylindrical member 63 having the lower end coupled to a pipe 81, a filter rod 65 put on the upper end of cylindrical member 63 and passed through recess 35 to enter into air chamber 50, a filter board 66 shaped to fit into the inside of filter tank 60, and two larger holes 67 on the bottom.

In operation, pump air into egg-laying container 40 through pipe 81, filter rod 65, air chamber 50, and outlet 522. As such, fishes may get fresh air. At the same time, water contained in the housing 30 is also circulated. As such, feces and eggs both may drop into the bottom of housing 30 through inverted cone-shaped member 43 and hole 44. It is understood that feces are solved in the water. Further, such solved feces is flowed onto filter board 66 of filter tank 60 through the top openings 351 of recess 35. Furthermore, eggs may drop onto the bottom surface of housing 30 other than the recess 35 as best shown in FIG. 5. This much reduces the possibility of mixing eggs with feces.

In replacing filter board 66, simply insert hands into holes 67 after housing 30 is removed. Then exerts a downward force to pull the used filter board 66 out of filter tank 60.

Figure 6:
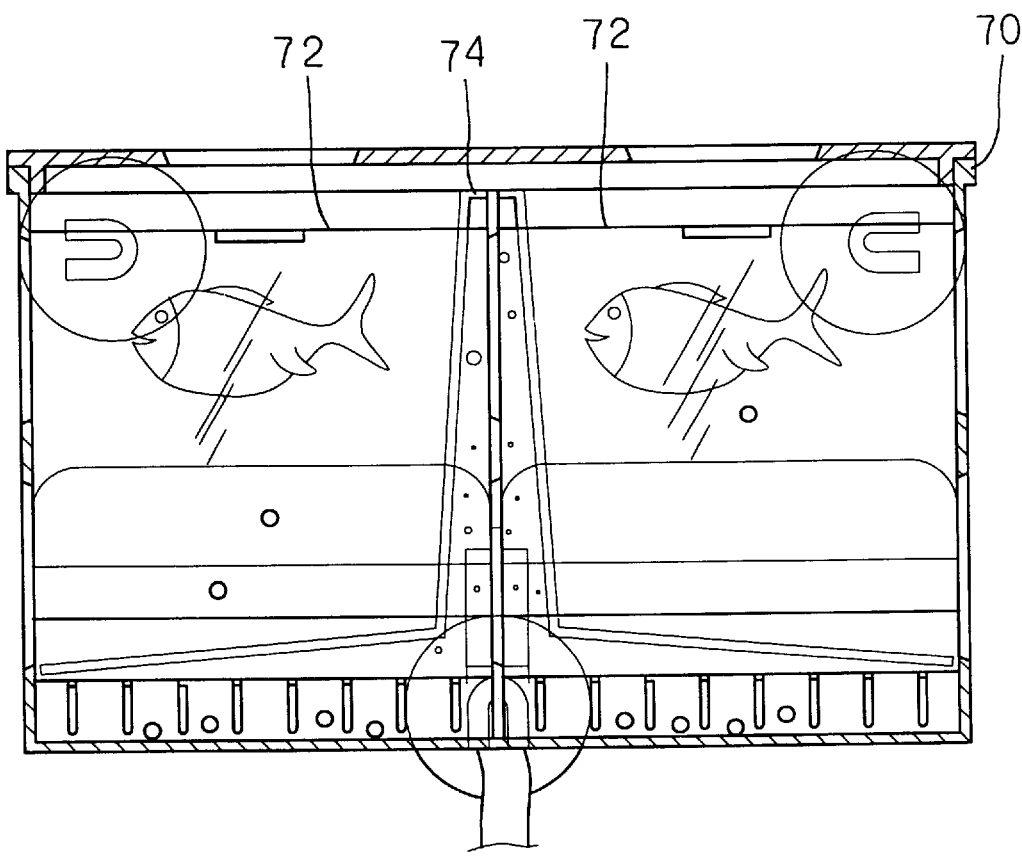
FIG. 6 is a side view of a second preferred embodiment of an egg-laying tank for home aquarium with egg protection device according to the invention.

Referring to FIG. 6, there is shown a second embodiment of the invention. This is a double egg-laying container 72 arrangement wherein housing 70 is divided into two chambers by a separating wall 74 which is slidably guided on two opposite rails on the sides of housing 70.

While the invention has been described by means of specific embodiments, numerous modifications and variations could be made thereto by those skilled in the art without departing from the scope and spirit of the invention set forth in the claims.

What is claimed is:

1. An egg-laying tank for raising fishes comprising:
 a housing filled with water including a plurality of vertical elongate openings spaced from each other on the lateral sides, a slot on the top of the front, two spaced grooves in the rear each having a suction cup secured to a fish tank, a pair of opposite guided rails on the lateral sides, a recess in the bottom abutted on the lateral side having a plurality of horizontal elongate openings spaced from each other on the top of the recess, and a cover applied thereon to securely close the housing;
 an egg-laying container open to the top including a plurality of vertical elongate openings spaced from each other on the lateral sides, a tab on the top of the front engaged with the slot for being supported on the housing, an inverted cone-shaped member, and a hole at the small end;

an air chamber including a plate slidably guided in the rails and a channel in the rear having a funnel-shaped inlet in the bottom and an outlet on the top being in communication with the egg-laying container; and a filter tank open to the top including a plurality of elongate openings spaced from each other on the lateral sides and the bottom side, a pair of opposite ridges on the lateral sides for frictionally connected to the lateral sides of the recess, a hollow cylindrical member in the rear, a tube enclosed by the cylindrical member having the lower end coupled to a pipe, a filter rod put on the upper end of the cylindrical member and passed through the recess to enter into the air chamber, and a filter board shaped to fit into the inside of the filter tank, whereby pump air into the egg-laying container through the pipe, the filter rod, and the air chamber for causing water in the housing to flow such that the solved feces of fishes are flowed onto the filter board through the inverted cone-shaped member, the hole, and the top openings of the recess and the eggs of fishes are dropped onto the bottom of the housing other than the filter board through the inverted cone-shaped member and the hole.

2. The egg-laying tank of claim 1, wherein the filter thank further comprises one or more apertures on the bottom.

* * * * *